United States Patent [19]
Kitamura et al.

[11] Patent Number: 5,043,868
[45] Date of Patent: Aug. 27, 1991

[54] SYSTEM FOR BY-PASS CONTROL IN PIPELINE OPERATION OF COMPUTER

[75] Inventors: Toshiaki Kitamura, Tokyo; Yuji Oinaga, Tokyo; Katsumi Onishi, Kawagoe, all of Japan

[73] Assignee: Fujitsu Limited, Kawasaki, Japan

[21] Appl. No.: 453,193

[22] Filed: Dec. 19, 1989

Related U.S. Application Data

[63] Continuation of Ser. No. 139,103, Dec. 24, 1987, abandoned.

[30] Foreign Application Priority Data

Feb. 24, 1984 [JP] Japan ............................... 59-34056
Feb. 24, 1984 [JP] Japan ............................... 59-34057

[51] Int. Cl.$^5$ ............................................. G06F 9/38
[52] U.S. Cl. ............................. 364/200; 364/231.8; 364/262.5
[58] Field of Search ... 364/200 MS File, 900 MS File

[56] References Cited

U.S. PATENT DOCUMENTS

| | | | |
|---|---|---|---|
| 3,449,724 | 6/1969 | Boland et al. | 364/200 |
| 3,736,566 | 5/1973 | Anderson et al. | 364/200 |
| 3,949,379 | 4/1976 | Ball | 364/200 |
| 4,025,771 | 5/1977 | Lynch, Jr. et al. | 364/200 |
| 4,373,180 | 2/1983 | Linde | 364/200 |
| 4,379,328 | 4/1983 | Catiller et al. | 364/200 |
| 4,390,946 | 6/1983 | Lane | 364/200 |
| 4,392,200 | 7/1983 | Arulpragasam et al. | 364/200 |
| 4,398,245 | 8/1983 | Fujita | 364/200 |
| 4,399,507 | 8/1983 | Cosgrove et al. | 364/200 |
| 4,414,669 | 11/1983 | Heckelman et al. | 364/200 |
| 4,454,578 | 6/1984 | Matsumoto et al. | 364/200 |
| 4,467,409 | 8/1984 | Potash et al. | 364/200 |
| 4,484,349 | 11/1984 | McCubbrey | 382/49 |
| 4,532,589 | 7/1985 | Shintani et al. | 364/200 |
| 4,594,655 | 6/1986 | Hao et al. | 364/200 |
| 4,616,313 | 10/1986 | Aoyagi | 364/200 |
| 4,626,989 | 12/1986 | Torii | 364/200 |
| 4,639,430 | 1/1987 | Sternberg . | |
| 4,750,112 | 6/1988 | Jones et al. | 364/200 |

FOREIGN PATENT DOCUMENTS 0097956 1/1984 European Pat. Off. .
2115964 9/1983 United Kingdom .

OTHER PUBLICATIONS

*Principles of Digital Computer Design*, by Abd-alla, et al. ® 1976 by Prentice-Hall (N.J.), pp. 187-251.
*Microprocessors and Microcomputer Development Systems*, by Rafiquzzaman, copyright 1984, pp. 600-603.
IBM Technical Disclosure Bulletin, vol. 14, No. 3, Aug. 1971, pp. 868, 869, New York, U.S.; R. J. Bullions et al.: "Resolving Store-Load Links in an Instruction Unit".
IBM Technical Disclosure Bulletin, vol. 14, No. 10, Mar. 1972, pp. 2930-2933, New York, U.S.; D. Sofer et al.: "Parallel Pipeline Organization of Execution Unit".

*Primary Examiner*—Lawrence E. Anderson
*Attorney, Agent, or Firm*—Staas & Halsey

[57] ABSTRACT

A system for computer pipeline operation in which a plurality of instructions are executed in parallel by commencing, before the termination of execution of the preceding instruction, the execution of the present instruction, including a conflict detection unit, a data establishment indication unit, and a source data by-pass unit. The source data by-pass unit by-passes a source data to the processing stage which requires this source data immediately after conflict is detected between the result data of the preceding instruction and the source data of the present instruction and the establishment of the source data of the present instruction is detected.

7 Claims, 10 Drawing Sheets

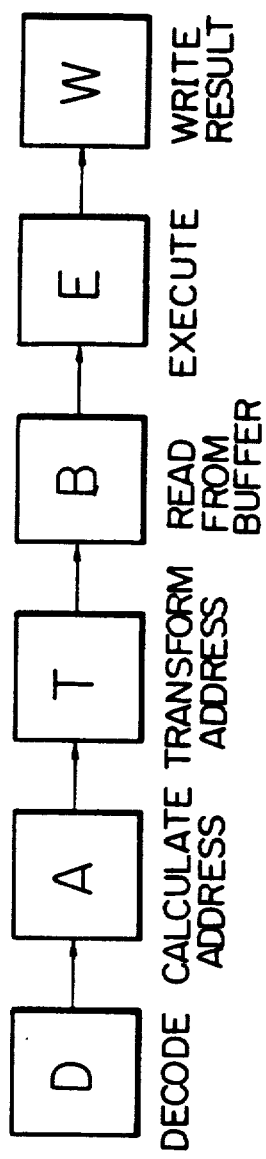
Fig. 1A FLOW OF INSTRUCTIONS
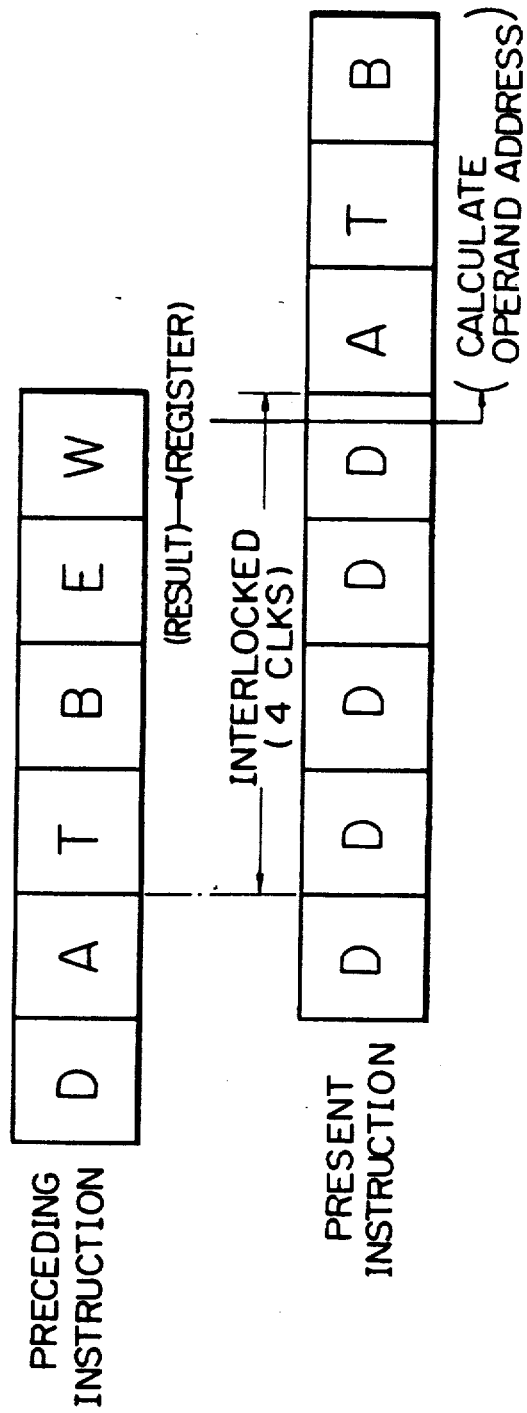
Fig. 1B EXAMPLE OF PIPELINE FLOW

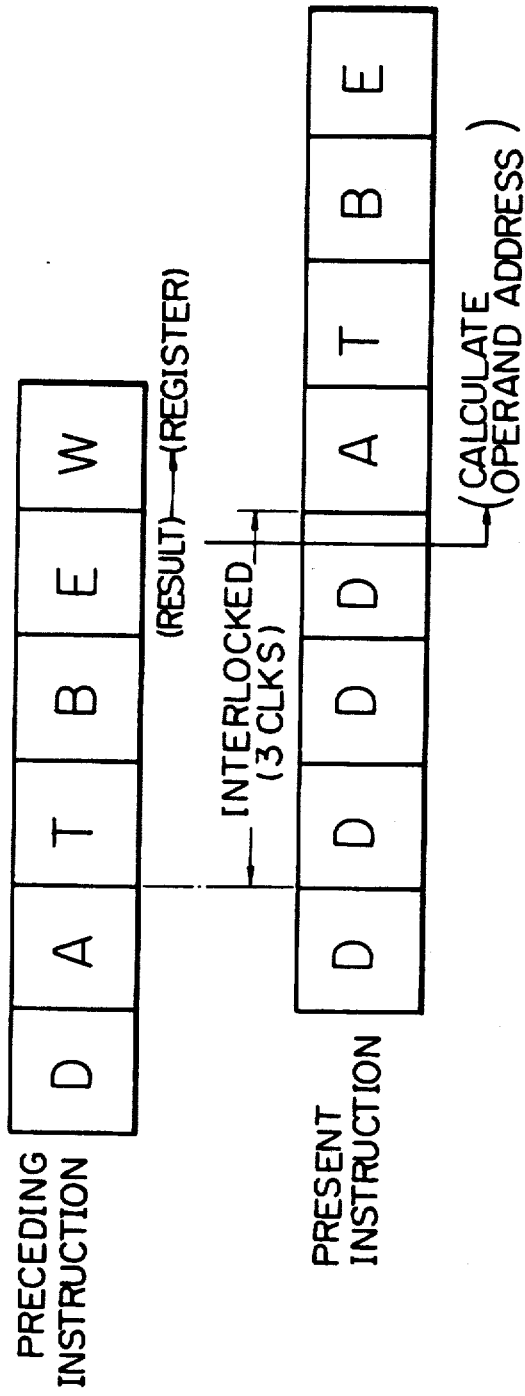
Fig. 1C EXAMPLE OF PIPELINE FLOW

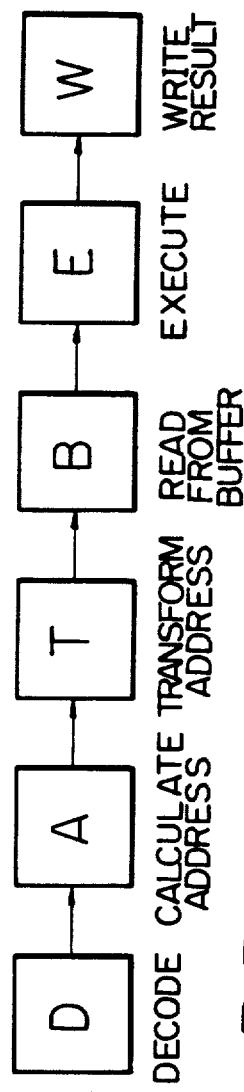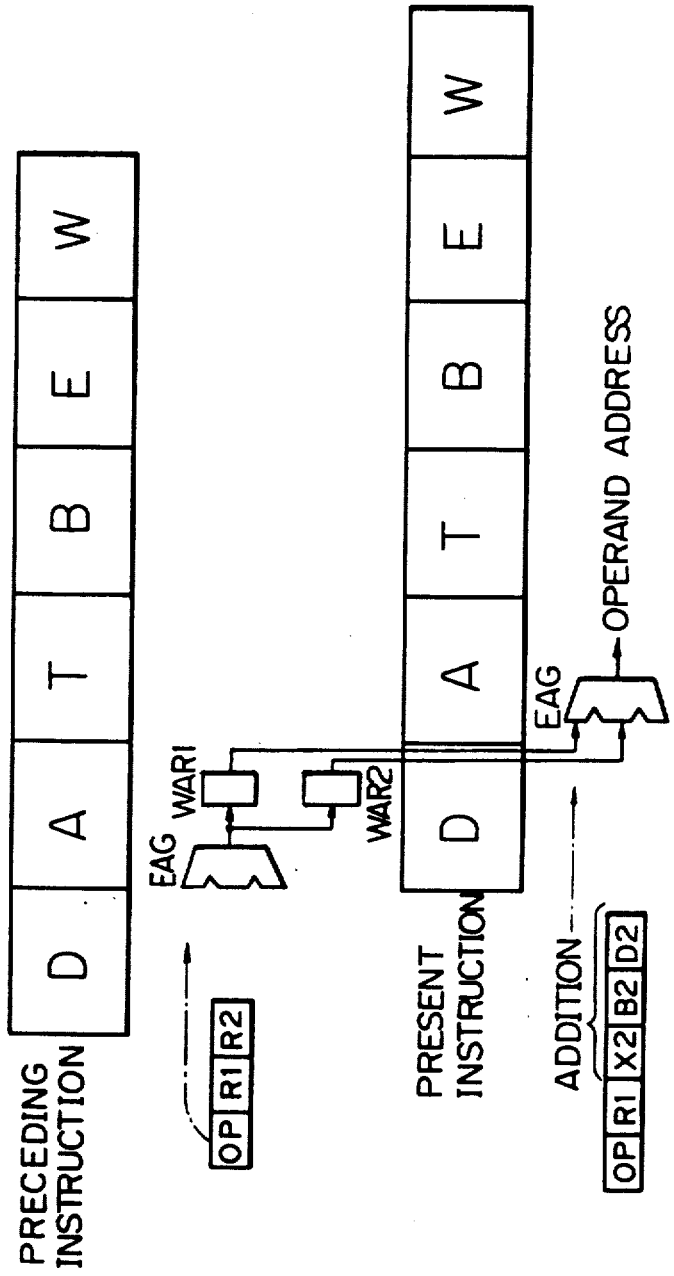
Fig. 3A FLOW OF INSTRUCTIONS
Fig. 3B PIPELINE FLOW

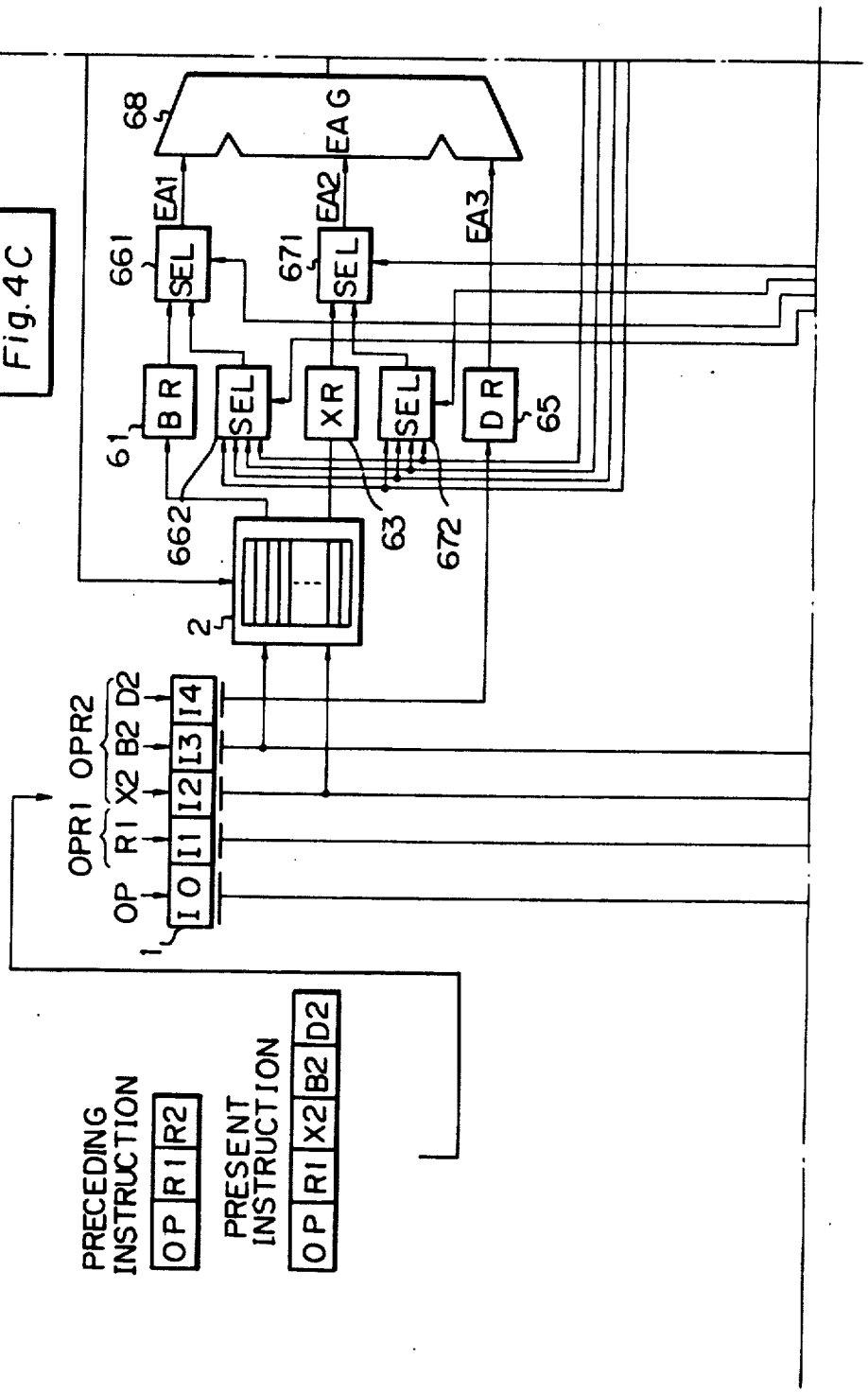

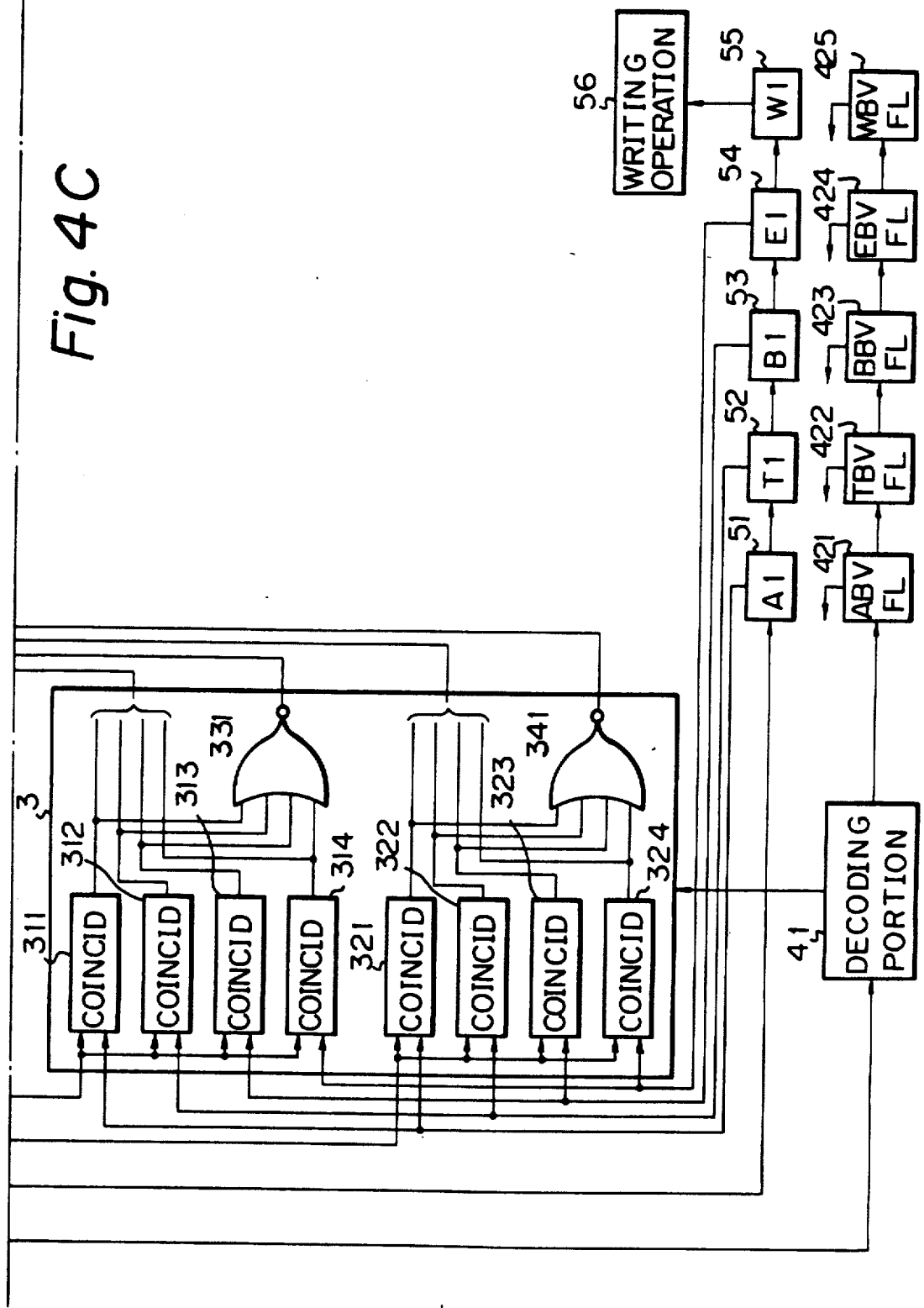

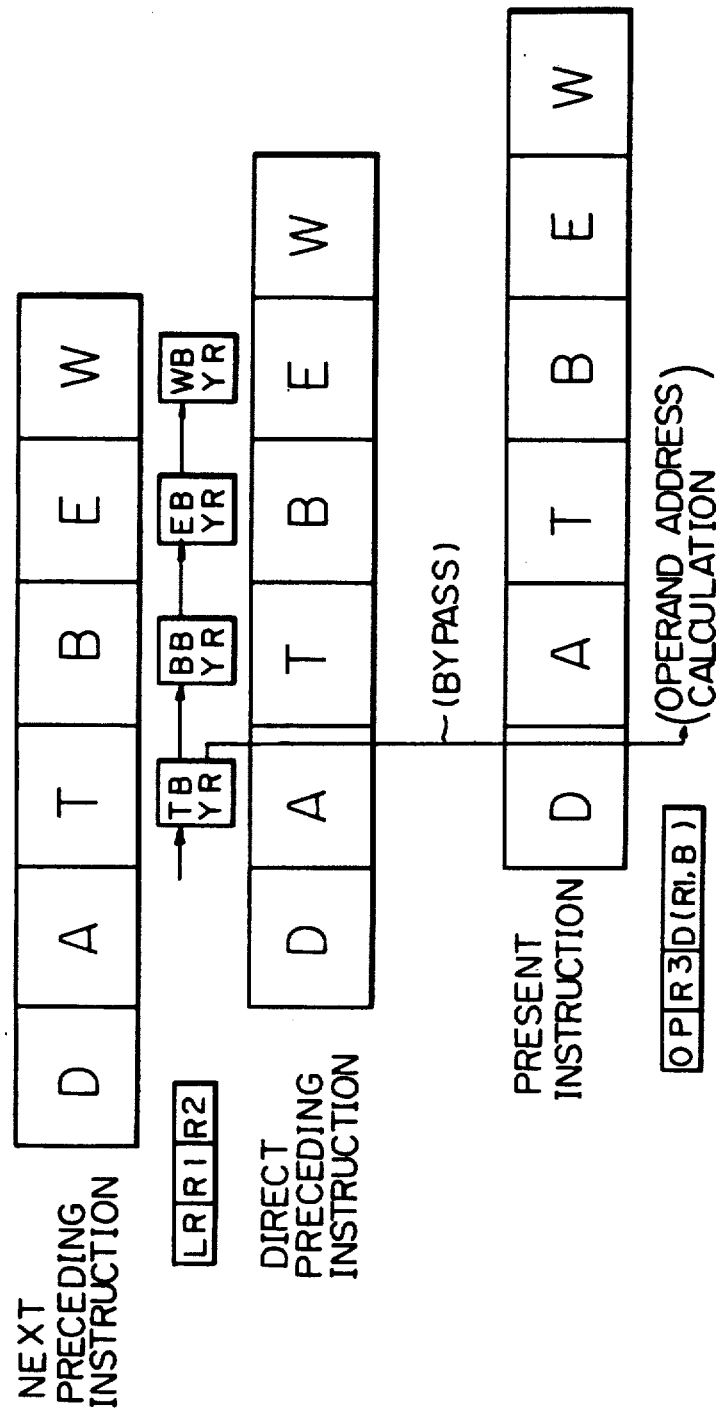
Fig. 5 PIPELINE FLOW FOR SYSTEM OF FIGURE 4

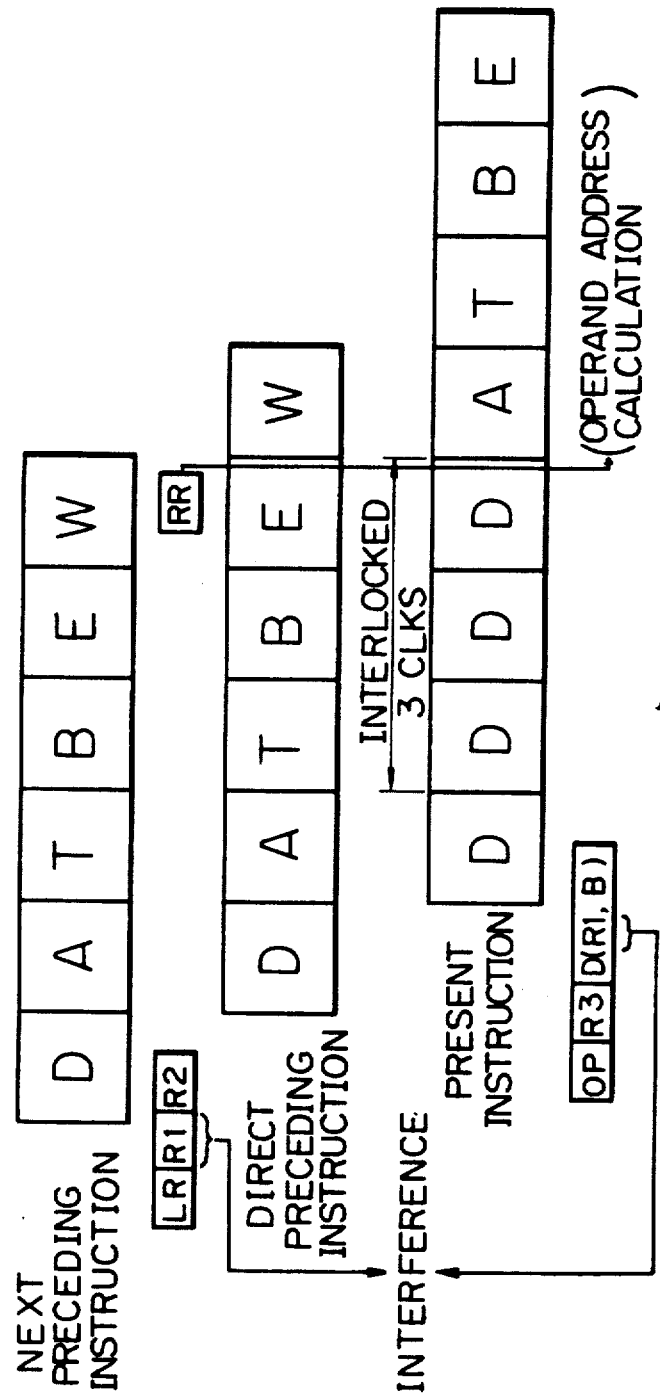
Fig. 6  PIPELINE FLOW FOR PRIOR ART

SYSTEM FOR BY-PASS CONTROL IN PIPELINE OPERATION OF COMPUTER

This is a continuation of copending application Ser. No. 07/139,103 filed on Dec. 24, 1987 now abandoned.

BACKGROUND OF THE INVENTION

1. Field of the Invention

The present invention relates to a system for by-pass control during pipeline operation of a computer.

2. Description of the Related Arts

During a pipeline operation of a computer, a register conflict can occur when a register, in which a change of data is taking place due to execution of a preceding instruction, is referred to by a present instruction. When such a register conflict occurs, reference to this register by the present instruction can be carried out only after completion of the execution of the preceding instruction for a change of data.

Usually the flow of instructions in the pipeline operation consists of a decoding stage D for decoding an instruction, a calculate address stage A for calculating an operand address, a transform address stage T for transforming the operand address into an actual address, a read from buffer stage B for reading the operand from a buffer memory controlled by a storage control circuit, an execute stage E for executing the calculation, and a write result stage W for checking the result of the calculation and writing (storing) the result.

SUMMARY OF THE INVENTION

It is an object of the present invention to realize an improved pipeline operation of a computer in which a delay in operation due to a register conflict during the flow of the pipeline operation is reduced, and to increase the speed of control of the execution of the instructions in the pipeline operation.

Accordingly, the present invention provides a system for by-pass control during pipeline operation of a computer, using a plurality of processing stages, in which an instruction is executed in a plurality of periods, and a plurality of instructions are executed in parallel by commencing, before the termination of execution of a preceding instruction, the execution of a present instruction. The system includes a conflict detection means for detecting a conflict between the result data of the preceding instruction and the source data of the present instruction; a data establishment indication means for indicating the establishment of the result data of the preceding instruction prior to the usual result writing period, and a source data by-pass means for by-passing the source data to the processing stage which requires this source data immediately after detecting the conflict between the result data of the preceding instruction and the source data of the present instruction and detecting the establishment of the source data for the present instruction.

BRIEF DESCRIPTION OF THE DRAWINGS

FIGS. 1A, 1B and 1C illustrate examples of the typical pipeline flow;

FIGS. 3A and 3B illustrate the pipeline flow in the system shown in FIG. 2;

FIGS. 4A, 4B and 4C illustrate a second embodiment of the present invention;

FIG. 5 illustrates the pipeline flow for the system shown in FIG. 4;

FIG. 6 illustrates a typical pipeline flow for explaining the difference between that flow and the pipeline flow shown in FIG. 5.

DESCRIPTION OF THE PREFERRED EMBODIMENTS

Figure 2:
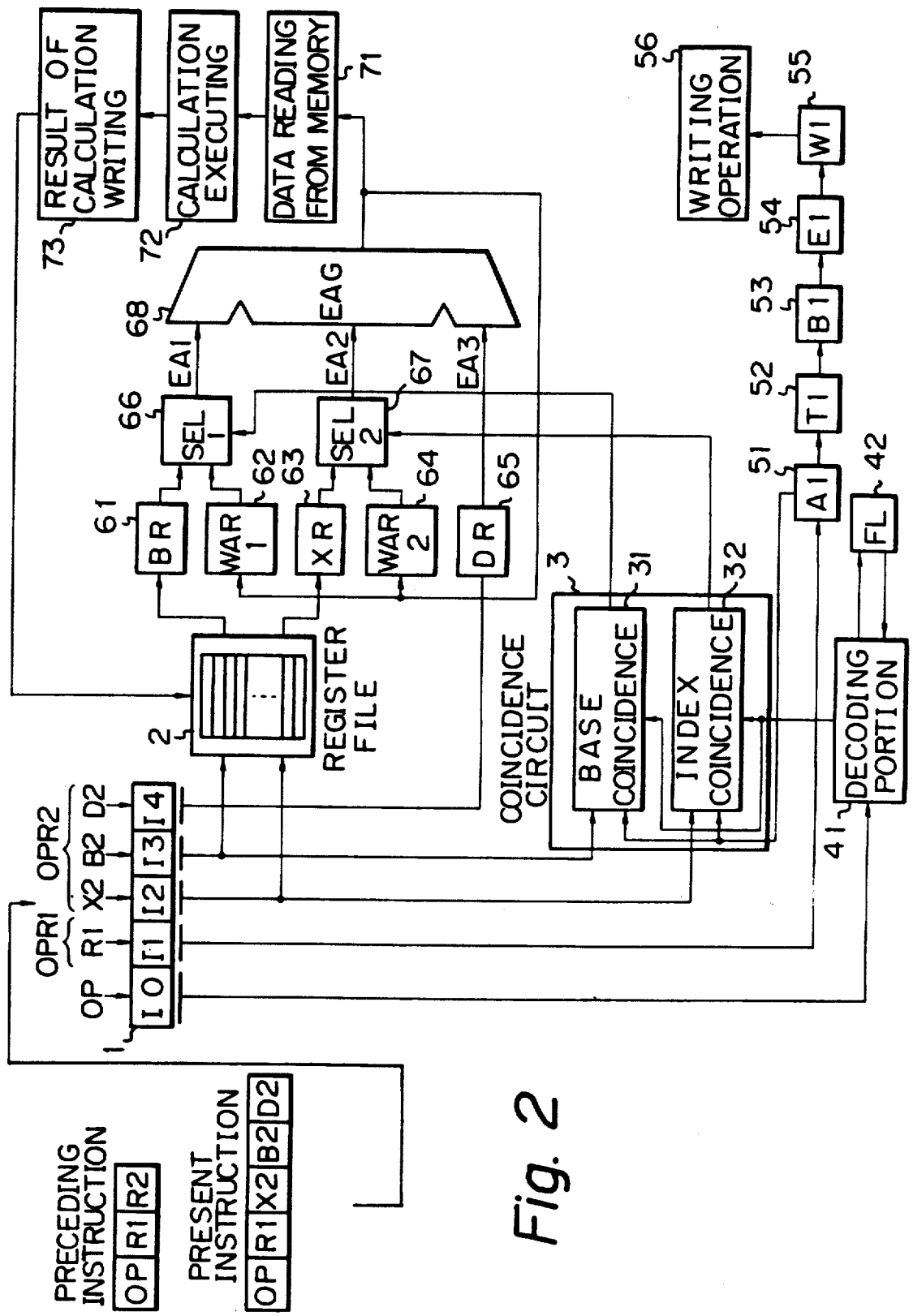
FIG. 2 is a block diagram of the system for by-pass control during pipeline operation of a computer according to a first embodiment of the present invention.

The system for by-pass control during pipeline operation of a computer according to a first embodiment of the present invention is shown in FIG. 2. The system of FIG. 2 comprises an instruction register 1, a register file 2, a coincidence circuit 3, a decoding portion 41, a by-pass valid flag register 42, register writing address holding registers 51, 52, 53, 54, and 55, and a writing operation portion 56. The system of FIG. 2 also comprises a base register 61, an operand address holding register 62, an index register 63, an operand address holding register 64, a displacement register 65, selectors 66 and 67, an adder/subtracter 68 for calculating addresses, an instruction portion 71 for instructing data reading from a memory, an instruction portion 72 for instructing execution of calculation, and an instruction portion 73 for instructing the writing of the result of the calculation.

According to the system of the present invention, an instruction fetched from the main storage is stored in the instruction register 1. This instruction includes, for example, an operation code OP, a first operand OPR1, and a second operand OPR2. In a load type instruction, the first operand OPR1 is an operand to be written, and the second operand OPR2 is an operand for referral (i.e., destination of the first operand). In the example of a store instruction shown in the instruction register 1 of FIG. 2, the second operand OPR2 comprises an index register number X2, a base register number B2, and a displacement D2.

The register file 2 is a memory including a general use register, a floating point register. The output of the register file 2 is supplied to the base register 61 and the index register 63.

The selector 66 supplies as its output, either the output of the base register 61 or the output of the operand address holding register 62, in accordance with the output of coincidence circuit 3 which functions as a control input. The selector 67 provides as its output, either the output of the index register 63 or the output of the operand address holding register 64, in accordance with the output of coincidence circuit 3 which functions as a control input.

The adder/subtracter 68 receives the data from the selectors 66 and 67, and the displacement register 65, and carries out addition or subtraction on the basis of the received data to obtain an operand address.

The operand address calculated by the adder/subtracter 68 is supplied to the registers 62 and 64 for holding the operand address.

Typically, the operand address holding registers, such as the registers 62 and 64 in FIG. 2, temporarily store and update an operand address in order to facilitate the treating of an operand address having a variable length in the main storage. In the system of FIG. 2 according to the present invention, these registers are utilized for holding by-pass data.

The coincidence circuit 3 detects a conflict between the register specified to store the result of the execution of the preceding (first) instruction and the register specified to calculate the operand address of the present (second) instruction. The outputs of the selectors 66 and 67 are controlled by the outputs of the coincidence circuit 3.

The decoding portion 41 analyzes the operation code of an instruction. The decoding portion 41 determines whether or not the preceding (first) instruction is an instruction which executes calculation of register writing data, on the basis of the output of the adder/subtracter 68. The valid flag register 42 is set or reset on the basis of this determination. For example, when instruction can obtain the result of the execution of the instruction at a relatively early cycle during execution of the instruction, such as a load-address (LA) instruction, the valid flag is set in the valid flag register 42. When the valid flag is set, the by-pass control enable signal is supplied by the decoding portion 41 to the coincidence circuit 3.

The register writing addresses are stored as follows: A1 for stage A in register 51; T1 for stage T in register 52; B1 for stage B in register 53; E1 for stage E in register 54; and W1 for stage W in register 55.

The coincidence circuit 3 comprises a base coincidence circuit 31 and an index coincidence circuit 32. The base coincidence circuit 31 detects the coincidence between the register writing address A1 of the preceding instruction, such as that of the load-address instruction and the base modification register address, shown as the I3 portion of the present instruction. When coincidence is detected, the data from register 62, (not the data read from the register file 2), is supplied to the input port EA1 of the adder/subtracter 68 to carry out the by-pass operation.

The index coincidence circuit 32 detects the coincidence between the register writing address A1 of the preceding instruction and the index modification register address, shown as the I2 portion of the present instruction. When coincidence is detected, the data of the register 64, (not the data read from the register file 2), is supplied to the input port EA2 of the adder/subtracter 68 to carry out the by-pass operation.

Thus, in the system of FIG. 2, a pipeline flow having a minimum delay, as shown in FIG. 3B, is realized. The time required for the operation shown in FIG. 3B is reduced by 5 cycles compared to that shown in FIG 1B, and by 4 cycles compared to that shown in FIG. 1C.

Even if the register writing address A1 coincides with the base or the index, the by-pass operation is not carried out when the valid flag is reset in the valid flag register 42, and the operation is carried out with the usual waiting time.

Although in the above description the load-address (LA) instruction is used as an instruction which calculates the register writing data on the basis of the output of the adder/subtracter 68, other instructions can be used, provided that the instruction can obtain the result of the execution of the instruction at an early cycle during execution of the instruction.

Figure 4B:
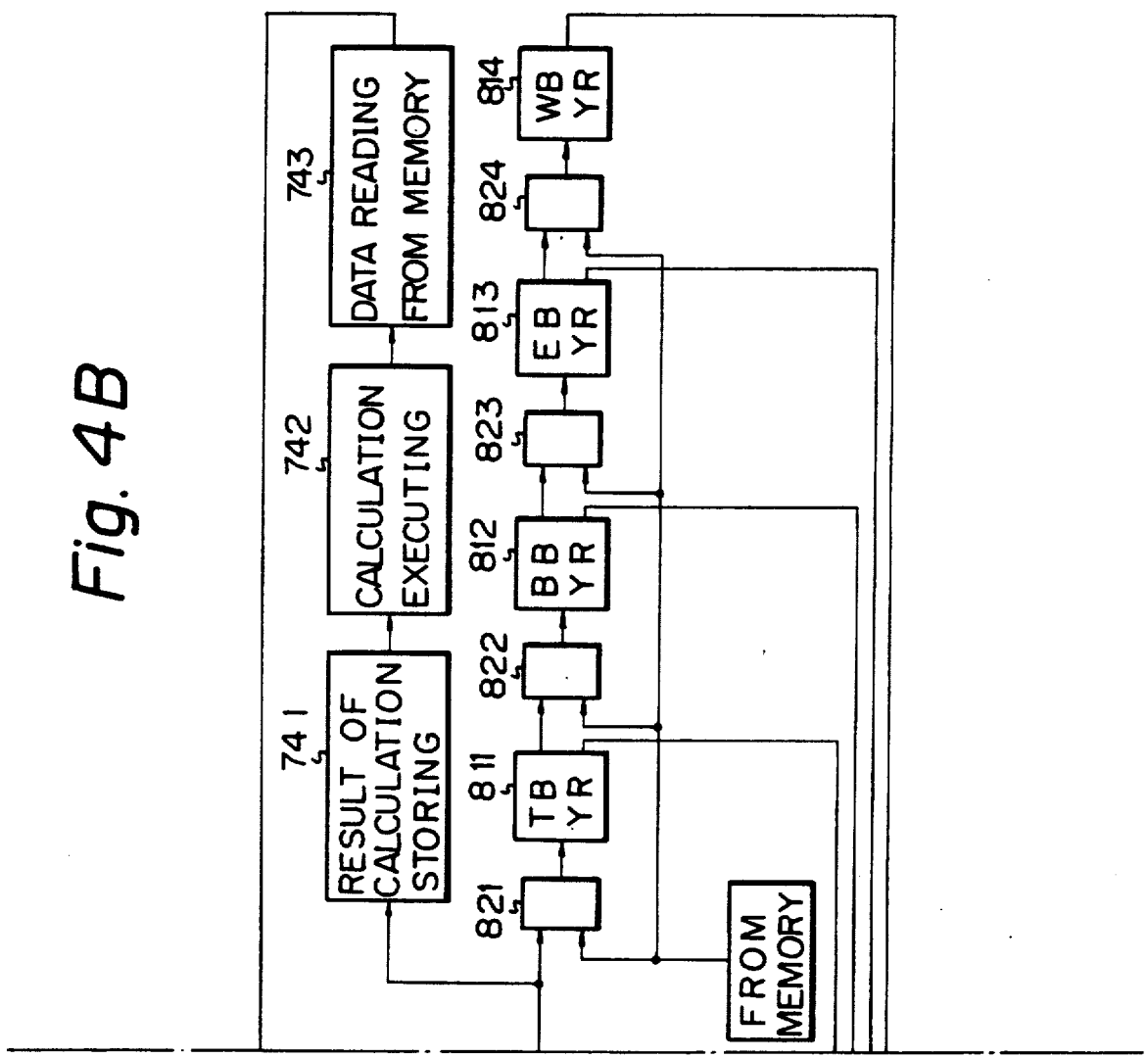

The system for by-pass control in the pipeline operation of a computer according to a second embodiment of the present invention is shown in FIG. 4. The system of FIG. 4 comprises an instruction register 1, a register file 2, a coincidence circuit 3, a decoding portion 41, by-pass valid flag registers 421, 422, 423, 424, and 425, and register writing address holding registers 51, 52, 53, 54, and 55.

The system of FIG. 4 also comprises a base register 61, an index register 63, selectors 661, 662, 671, and 672, a displacement register 65, and an adder/subtracter 68 for calculating addresses. The system of FIG. 4 further comprises by-pass registers 811, 812, 813, and 814 corresponding to the stages of the operation, selectors 821, 822, 823, and 824, a result of calculation storing portion 741, a calculation executing portion 742, and a data reading from memory portion 743.

The adder/subtracter 68 adds or subtracts on the basis of the data from the base register 61, index register 63, the displacement register 65, and the by-pass registers 811, 812, 813, and 814 to calculate an operand address. The operand address calculated by the adder/subtracter 68 is used as a memory address and is successively applied to the by-pass registers 811, 812, 813, and 814. The number of by-pass registers corresponds to the number of stages of the pipeline after stage A.

The coincidence circuit 3 comprises coincidence elements 311 to 314 and 321 to 324, and NOR gates 331 and 341. The coincidence elements compare either the base modification portion I3 or the index modification I2 of the instruction, with the register writing addresses A1 to E1 in the stages of the operation.

For example, the coincidence element 311 detects the coincidence between the register writing address A1 of the preceding instruction, such as a load address (LA) instruction, and the base modification address I3 of the present instruction. If coincidence is detected, the data of the by-pass register 811 (TBYR) is supplied to the input port EA1 of the adder/subtracter 68 to cause the by-pass operation. If no coincidence is detected in the coincidence elements 311 to 314, the data of the base register 61 is supplied to the input port EA1 of the adder/subtracter 68. Thus, in the system of FIG. 4, a pipeline flow having a minimum of delay, as shown in FIG. 5, is realized.

To illustrate the difference between the the present invention and the prior art, the pipeline flow for the prior art is shown in FIG. 6.

Figure 7:
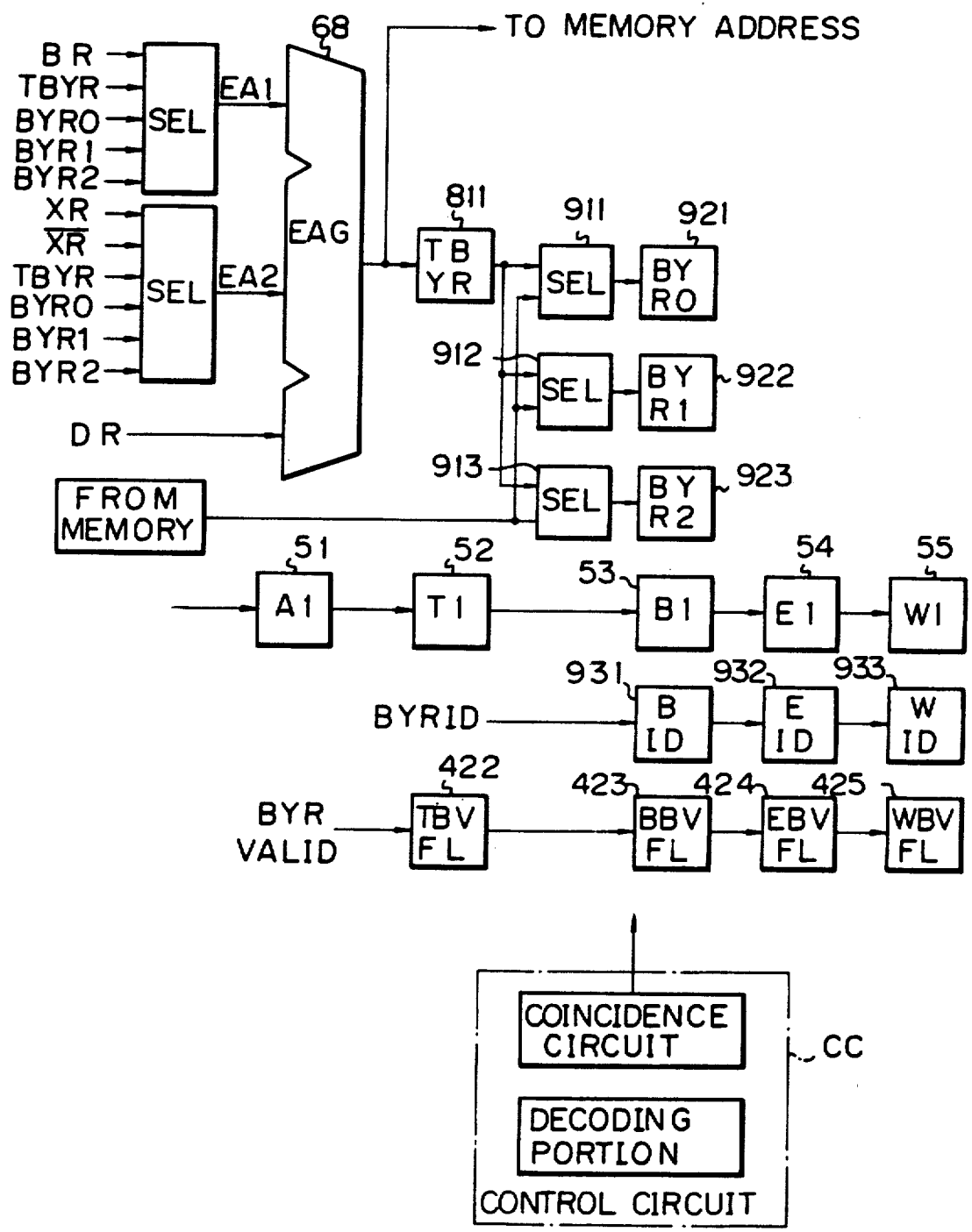
FIG. 7 illustrates a third embodiment of the present invention.

A third embodiment of the present invention is illustrated in FIG. 7. The system shown in FIG. 7 comprises selectors 911, 912, and 913, by-pass registers 921, 922, and 923, and identification number registers 931, 932, and 933. The control circuit including the coincidence circuit and decoding portion, such as shown in FIG. 4, is denoted as CC.

The identification numbers (ID) 0, 1, and 2 are assigned to the by-pass registers 921, 922, and 923, respectively, for the read from buffer stage B, the execute stage E, and the write result stage W. The transfer of the data from the by-pass register 811 (TBYR) to the registers 921, 922, and 923 is carried out by changing the identification number successively with the sequence 0, 1, 2, 0, 1, 2, . . . .

Only the identification numbers are held in the identification number registers 931, 932, and 933. These identification numbers are used to select the by-pass registers, thus causing by-pass control in accordance with the identification number registers.

In the system shown in FIG. 7, when a register conflict occurs, a by-pass operation for the data of the by-pass register as register read data and the operand address calculation is carried out, provided that the corresponding by-pass valid flags in the by-pass valid flag registers 18 to 21 indicate the valid state and that the data is registered in the by-pass register, thus enabling the pipeline operation to proceed satisfactorily.

We claim:

1. A system for bypass control of a pipeline processor in a computer, the pipeline processor having a plurality of stages including an address calculation stage and a result writing stage, said system comprising:
   receiving means, outside the stages of the pipeline processor following the address calculation stage, for receiving instructions including a first instruction followed by a second instruction, the instructions including operands;
   holding means for holding a calculated output produced by the address calculation stage;
   conflict detection means for detecting a conflict between a source address in one of the operands of the second instruction and a destination address of the first instruction after the first instruction has completed the address calculation stage;
   indication means for indicating availability of final output from the first instruction prior to the first instruction passing the result writing stage; and
   bypass means for providing the calculated output of the first instruction to the address calculation stage immediately after said conflict detection means detects a conflict and said indication means indicates the final output from the first instruction is available, whereby said conflict detection means performs coincidence detection for certain instructions to indicate that in the address calculation stage the first instruction produces the final output for use by the second instruction.

2. A system according to claim 1,
   wherein the pipeline processor further includes, between the address calculation stage and the result writing stage, a data fetch stage for fetching the data from said registers in said receiving means and an execution stage for executing the instructions,
   wherein said receiving means comprises registers for storing instructions, addresses and data,
   wherein said conflict detection means comprises coincidence means for detecting register conflicts in the pipeline processor,
   wherein said indication means comprises bypass permission data storage means for storing bypass permission data in dependence upon instruction type, and
   wherein said bypass means comprises:
      bypass registers, corresponding to said bypass permission data storage means, for storing address modification data, each of said bypass registers corresponding to one of the stages of the pipeline processor between the address calculation stage and the result writing stage, inclusive; and
      control means for supplying the address modification data to the address calculation stage for the second instruction via said bypass registers when the conflict is detected by said conflict detection means and said indication means provides an indication that the first instruction has a first instruction type producing the calculated output in the address calculation stage to be stored as the final output in one of the registers in said receiving means and the second instruction has a second instruction type obtaining stored data from the registers in said receiving means during the data fetch stage.

3. A system according to claim 1,
   wherein said receiving means comprises registers for storing instructions, addresses and data,
   wherein the pipeline processor further includes a data fetch stage for fetching the data from said registers in said receiving means and an execution stage for executing the instructions, and
   wherein said conflict detection means detects conflicts between first and second registers included in said registers, the first register addressed by the first instruction to receive the final output of the first instruction and the second register addressed by the second instruction to provide information necessary for address calculation of the second instruction.

4. A system according to claim 3, wherein said indication means includes means for detecting a predetermined instruction type producing, during the address calculation stage, the final output to be written by the result writing stage.

5. A system according to claim 4,
   wherein said indication means provides an indication of availability of the final output from the first instruction when the first instruction passes the address calculation stage and is of the predetermined instruction type, and
   wherein said bypass means comprises control means for supplying the calculated output of the first instruction to the address calculation stage from said holding means upon detection of the conflict by said conflict detection means and providing of the indication by said indication means.

6. A pipeline processor in a computer, said pipeline processor having a plurality of stages and comprising:
   an instruction register, operatively connected to receive instructions, to store an incoming instruction entering said pipeline processor, each instruction capable of including an access operand identifying data to be operated on by the instruction and register address information identifying a register address for storing an output of the instruction;
   an address calculator, operatively connected to said instruction register, to supply a calculated output, produced in dependence upon the access operand in a corresponding instruction in an address calculation stage, to stages of said pipeline processor following said address calculator;
   operand address storage, operatively connected to said address calculator, outside the stages following said address calculator, for temporarily holding the calculated output from said address calculator;
   register address storage, operatively connected to said instruction register, to hold the register address information of the instruction in the stages of said pipeline processor;
   a coincidence circuit, operatively connected to said register address storage and said instruction register, to compare the register address information of the incoming instruction with the register address information of at least one of the instructions in the stages following said address calculator to produce a coincidence indication; and
   a selector, operatively connected to said instruction register, said operand address storage and said address calculator, to supply to said address calculator one of the access operand of the incoming instruction stored in said instruction register and the calculated output stored in said operand address storage, in dependence upon the coincidence indication, whereby said coincidence circuit provides the coincidence indication based upon the register address information to indicate that said selector can supply the calculated output for a previous instruction from said address calculator to said operand address storage as a final output for use by a subsequent instruction in said pipeline processor.

7. A pipeline processor as recited in claim 6,
wherein said instruction register includes space for at least one of an index register identifier and a base register identifier, and wherein said coincidence circuit comprises:
  an index coincidence circuit for comparing the index register identifier in said instruction register with the register address information of the at least one of the instructions in the stages following said address calculator; and
  a base coincidence circuit for comparing the base register identifier in said instruction register with the register address information of the at least one of the instructions in the stages following said address calculator.

* * * * *

UNITED STATES PATENT AND TRADEMARK OFFICE
CERTIFICATE OF CORRECTION

PATENT NO. : 5,043,868

DATED : August 27, 1991

INVENTOR(S) : Kitamura et al.

It is certified that error appears in the above-identified patent and that said Letters Patent is hereby corrected as shown below:

TITLE PAGE [75] Inventors:

line 2, "Tokyo;" should be --Sagamihara;--;
    line 3, "Kawagoe," should be --Yokohama,--.

[63] line 2, after "doned" insert --which is a continuation of Ser. No. 701,503, Feb. 14, 1985, abandoned--.

[56], Col. 2, line 4, "4,639,430" should be --4,369,430-- and "1/1987 should be --1/1983--.

Col. 1, line 6, "abandoned." should be --abandoned, which is a continuation of Ser. No. 07/701,503 filed on February 14, 1985, also abandoned.--.

Signed and Sealed this

Twenty-third Day of February, 1993

*Attest:*

STEPHEN G. KUNIN

*Attesting Officer*     *Acting Commissioner of Patents and Trademarks*